(12) United States Patent
Konishi et al.

(10) Patent No.: US 9,027,954 B2
(45) Date of Patent: May 12, 2015

(54) AIRBAG DEVICE

(75) Inventors: Shuhei Konishi, Settsu (JP); Tomoki Hashizume, Settsu (JP); Yuta Minami, Settsu (JP)

(73) Assignee: Ashimori Industry Co., Ltd., Osaka (JP)

( * ) Notice: Subject to any disclaimer, the term of this patent is extended or adjusted under 35 U.S.C. 154(b) by 0 days.

(21) Appl. No.: 14/342,082

(22) PCT Filed: Aug. 31, 2012

(86) PCT No.: PCT/JP2012/072238
§ 371 (c)(1),
(2), (4) Date: Mar. 24, 2014

(87) PCT Pub. No.: WO2013/031980
PCT Pub. Date: Mar. 7, 2013

(65) Prior Publication Data
US 2014/0217707 A1    Aug. 7, 2014

(30) Foreign Application Priority Data
Sep. 2, 2011   (JP) ................................. 2011-192090

(51) Int. Cl.
*B60R 21/2338* (2011.01)
*B60R 21/231* (2011.01)
*B60R 21/213* (2011.01)
*B60R 21/232* (2011.01)
*B60R 21/16* (2006.01)

(52) U.S. Cl.
CPC ......... *B60R 21/23138* (2013.01); *B60R 21/213* (2013.01); *B60R 21/232* (2013.01); *B60R 21/2338* (2013.01); *B60R 2021/23386* (2013.01); *B60R 2021/161* (2013.01)

(58) Field of Classification Search
USPC ................................. 280/730.2, 728.2, 743.3
See application file for complete search history.

(56) References Cited

U.S. PATENT DOCUMENTS 6,464,250 B1 * 10/2002 Faigle et al. ............... 280/730.2
6,672,612 B2 * 1/2004 Sauer et al. ................ 280/730.2
6,695,342 B2 * 2/2004 Tanase et al. .............. 280/730.2

(Continued)

FOREIGN PATENT DOCUMENTS

JP   2002-370602 A   12/2002
JP   2003-531771 A   10/2003

(Continued)

OTHER PUBLICATIONS

International Search Report for PCT/JP2012/072238 dated Oct. 9, 2012.

*Primary Examiner* — Drew Brown
(74) *Attorney, Agent, or Firm* — Sughrue Mion, PLLC

(57) ABSTRACT

An airbag device (1), having an airbag (10), is installed in a side wall (91) inside a vehicle cabin. The airbag (10) includes an inflatable section (30) configured to be inflated with gas and is disposed in an upper portion of the side wall (91). An inflator (2) supplies gas to the inflatable section (30), inflating and deploying the airbag (10) downward. A connecting member (50) connects the airbag (10) and the vehicle body (99) and is pulled between the vehicle body (99) and the airbag (10) that is being inflated and deployed. When the airbag (10) is inflated and deployed, a support portion (51) of the connecting member (50) supports the inflatable section (30) from the side wall (91) side of the airbag and pushes it toward the inner side of the vehicle cabin.

8 Claims, 7 Drawing Sheets

(56) References Cited

U.S. PATENT DOCUMENTS

| | | | |
|---|---|---|---|
| 6,709,008 B2* | 3/2004 | McGee et al. | 280/729 |
| 6,758,490 B2* | 7/2004 | Hoeft et al. | 280/730.2 |
| 6,808,203 B2* | 10/2004 | Takahara | 280/740 |
| 6,820,893 B2* | 11/2004 | Tanase et al. | 280/730.2 |
| 7,658,401 B2* | 2/2010 | Valdez et al. | 280/730.2 |
| 7,661,701 B2* | 2/2010 | Hirata | 280/730.2 |
| 8,282,124 B2* | 10/2012 | Trovato et al. | 280/730.2 |
| 2003/0116946 A1 | 6/2003 | Roos | |
| 2004/0130129 A1* | 7/2004 | Takahara | 280/730.2 |
| 2006/0012156 A1* | 1/2006 | Boxey | 280/730.2 |
| 2007/0046001 A1 | 3/2007 | Hirata | |
| 2007/0052212 A1* | 3/2007 | Powals | 280/729 |
| 2008/0079246 A1* | 4/2008 | Dix | 280/730.2 |
| 2008/0238055 A1* | 10/2008 | Hotta et al. | 280/730.2 |
| 2009/0026742 A1* | 1/2009 | Noguchi et al. | 280/730.2 |
| 2010/0013203 A1* | 1/2010 | Mitchell et al. | 280/743.2 |
| 2010/0225097 A1 | 9/2010 | Trovato et al. | |

FOREIGN PATENT DOCUMENTS

| | | |
|---|---|---|
| JP | 2004-58848 A | 2/2004 |
| JP | 2004-90662 A | 3/2004 |
| JP | 2007-50847 A | 3/2007 |
| JP | 2007-84044 A | 4/2007 |
| JP | 2010-202187 A | 9/2010 |

* cited by examiner

AIRBAG DEVICE

CROSS REFERENCE TO RELATED APPLICATIONS

This application is a National Stage of International Application No. PCT/JP2012/072238 filed Aug. 31, 2012, claiming priority based on Japanese Patent Application No. 2011-192090 filed Sep. 2, 2011, the contents of all of which are incorporated herein by reference in their entirety.

TECHNICAL FIELD

The present invention relates to an airbag device that inflates and deploys an airbag along a side wall inside a vehicle cabin to protect an occupant with the airbag.

BACKGROUND ART

In order to protect an occupant in an emergency or in a collision of a vehicle, a side-wall airbag device is used. The airbag device is attached to an upper part of a side wall, inflates and deploys an airbag like a curtain, and receives and protects the occupant's head within the vehicle. In a known related-art airbag device of this type, an airbag is rolled such that the rolled portion faces the vehicle exterior side (see PTL 1).

In the related-art airbag device, the airbag is deployed along a window, while being unrolled and pressed against a window glass, and is inflated between the side wall and the occupant. In recent years, to prevent an occupant from being ejected from a vehicle, an airbag is required to inflate and deploy within the vehicle cabin, even when a window is open. However, in the related-art airbag device, the airbag is pushed toward the outside of the vehicle, so, when the window is open, the airbag might be pushed out of the vehicle through the opening of the window. Therefore, it is difficult to cause the airbag to reliably inflate and deploy within the vehicle cabin.

Another known related-art airbag device is configured to push, with a strap, an inflatable section of an airbag toward a side wall, while the airbag is being deployed (see PTL 2).

Also in this airbag device, when the window is open, the airbag might be pushed out of the vehicle through the opening of the window. Thus, it is difficult to cause the airbag to reliably inflate and deploy within the vehicle cabin.

CITATION LIST

Patent Literature

PTL 1: Japanese Unexamined Patent Application, Publication No. 2004-58848
PTL 2: Japanese Unexamined Patent Application, Publication No. 2004-90662

SUMMARY OF INVENTION

Technical Problem

The present invention has been made in view of the above-described problem incurred in the related art, and an object thereof is to cause an airbag to reliably inflate and deploy within a vehicle cabin when inflated and deployed along a side wall inside the vehicle cabin.

Solution to Problem

The present invention provides an airbag device installed in a side wall inside a vehicle cabin. The airbag device includes an airbag that is disposed in an upper portion of the side wall and has an inflatable section configured to be inflated with gas; an inflator that supplies gas to the inflatable section to inflate and deploy the airbag downward; and a connecting member that connects the airbag and a vehicle body and is pulled between the vehicle body and the airbag that is being inflated and deployed. The connecting member includes a support portion that supports the inflatable section from the side wall side of the airbag and pushes the inflatable section toward the inner side of the vehicle cabin when the airbag is inflated and deployed.

Advantageous Effects of Invention

According to the present invention, when the airbag is inflated and deployed along the side wall inside the vehicle cabin, the airbag is reliably inflated and deployed within the vehicle cabin.

DESCRIPTION OF EMBODIMENTS

An embodiment of an airbag device of the present invention will be described with reference to the drawings.

In this embodiment, a curtain airbag device (hereinbelow, simply, "airbag device"), which deploys an airbag like a curtain within a vehicle, will be described as an example. The airbag device is installed in a side wall inside a vehicle cabin. The airbag device receives and protects an occupant with the airbag, which is configured to inflate and deploy along the side wall inside the vehicle cabin.

Figure 1:
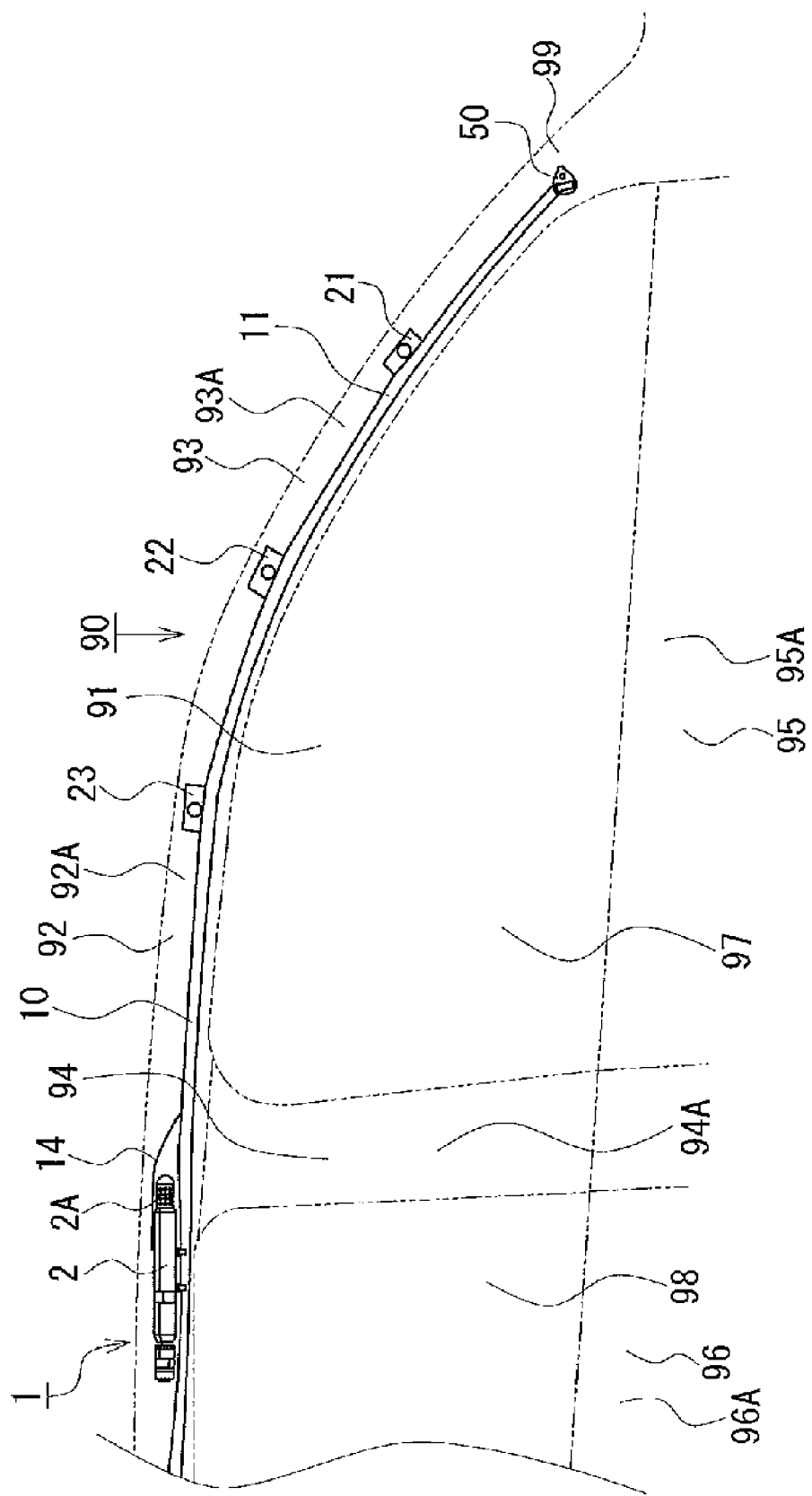
FIG. 1 is a diagram of an airbag device according to this embodiment.

FIG. 1 is a diagram of the airbag device according to this embodiment, showing an airbag device 1 installed in a vehicle 90 (indicated by two-dot chain line), as viewed from the outside of the vehicle. FIG. 1 shows a side wall 91 of the vehicle 90 and the airbag device 1, as viewed in the width direction of the vehicle 90, while omitting illustration of a rear side of the vehicle 90. The airbag device 1 is shown as seen through the vehicle 90, and in the vehicle 90, the respective portions of the side wall 91 inside the vehicle cabin are schematically shown.

Note that, in the present invention, the front side and rear side of the vehicle 90 are simply referred to as "front side" and "rear side", and the front-rear direction of the vehicle 90 is simply referred to as "front-rear direction". Furthermore, the upper side and lower side of the vehicle 90 are simply referred to as "upper side" and "lower side", and the top-bottom direction of the vehicle 90 is simply referred to as "top-bottom direction".

As shown in the figure, the vehicle 90 includes, on the side wall 91, a roof rail 92 on the upper side; a front pillar (A pillar) 93 on the front side; a center pillar (B pillar) 94; and a rear pillar (C pillar) (not shown) on the rear side. Furthermore, the vehicle 90 includes, on the side wall 91, a front door 95 on the front side; a rear door 96 on the rear side; and windows 97 and 98 provided in the doors 95 and 96. The front door 95 is a door that is provided on the most front side of the vehicle 90 and is located below the front pillar 93. The rear door 96 is a door that is provided on the most rear side of the vehicle 90.

Trims 93A to 96A and a portion of the headlining 92A are attached to the side wall 91 inside the vehicle cabin. The trims 93A to 96A constitute interior members of the vehicle 90, and the front pillar trim 93A and the center pillar trim 94A are provided on the inner surfaces of the pillars 93 and 94. The headlining 92A covers the roof (not shown) and the roof rail 92, and the inner surface of the side wall 91 is formed of the trims 93A to 96A, the headlining 92A, and panes of glass of the windows 97 and 98. The windows 97 and 98 are opened or closed within the side wall 91.

The airbag device 1 includes an airbag (curtain airbag) 10 and a cylindrical inflator 2. The airbag 10 is folded in such a manner that it can be inflated and deployed, and is attached to the inside of the vehicle 90. At this time, the airbag 10 is folded, for example, in an accordion manner from an edge on the lower side (hereinbelow, "lower edge") toward an edge on the upper side (hereinbelow, "upper edge"), or rolled from the lower edge toward the upper edge, such that the airbag is rolled to the side of the side wall 91. Alternatively, the airbag 10 is folded by a combination of the accordion fold and roll fold. By folding the airbag 10 in the above-described manner, when the airbag device 1 is activated, the airbag 10 is inflated and deployed along the side wall 91 (windows 97 and 98), between the occupant and the side wall 91. The airbag 10, folded in a long, narrow shape, is disposed at the upper part of the side wall 91 inside the vehicle cabin and is attached to the roof rail 92 along the front-rear direction, from the rear pillar to the front pillar 93.

The folded airbag 10 is disposed inside the front pillar trim 93A and the headlining 92A and is fixed to the vehicle body 99 with fixing means (not shown). The front pillar trim 93A and the headlining 92A are attached to the vehicle body 99 to cover the airbag 10. Inside the front pillar trim 93A, a front portion 11 of the airbag 10 is attached to the vehicle body 99.

The inflator 2 is a cylinder-type gas generator inserted into the airbag 10. The inflator 2 generates gas inside the airbag 10. The inflator 2 has a plurality of gas discharge ports 2A at one end in the longitudinal direction. The inflator 2 is disposed above the center pillar 94 and is attached to the roof rail 92. Inside the headlining 92A, the inflator 2 is fixed to the vehicle body 99 with fixing means (not shown). The inflator 2 discharges gas through the plurality of discharge ports 2A and supplies the gas to the airbag 10 in an emergency of the vehicle or when an impact is detected. With this gas, the airbag 10 is inflated and deployed downward from the upper part of the side wall 91. The airbag 10 is inflated and deployed like a curtain, along the side wall 91.

Figure 2:
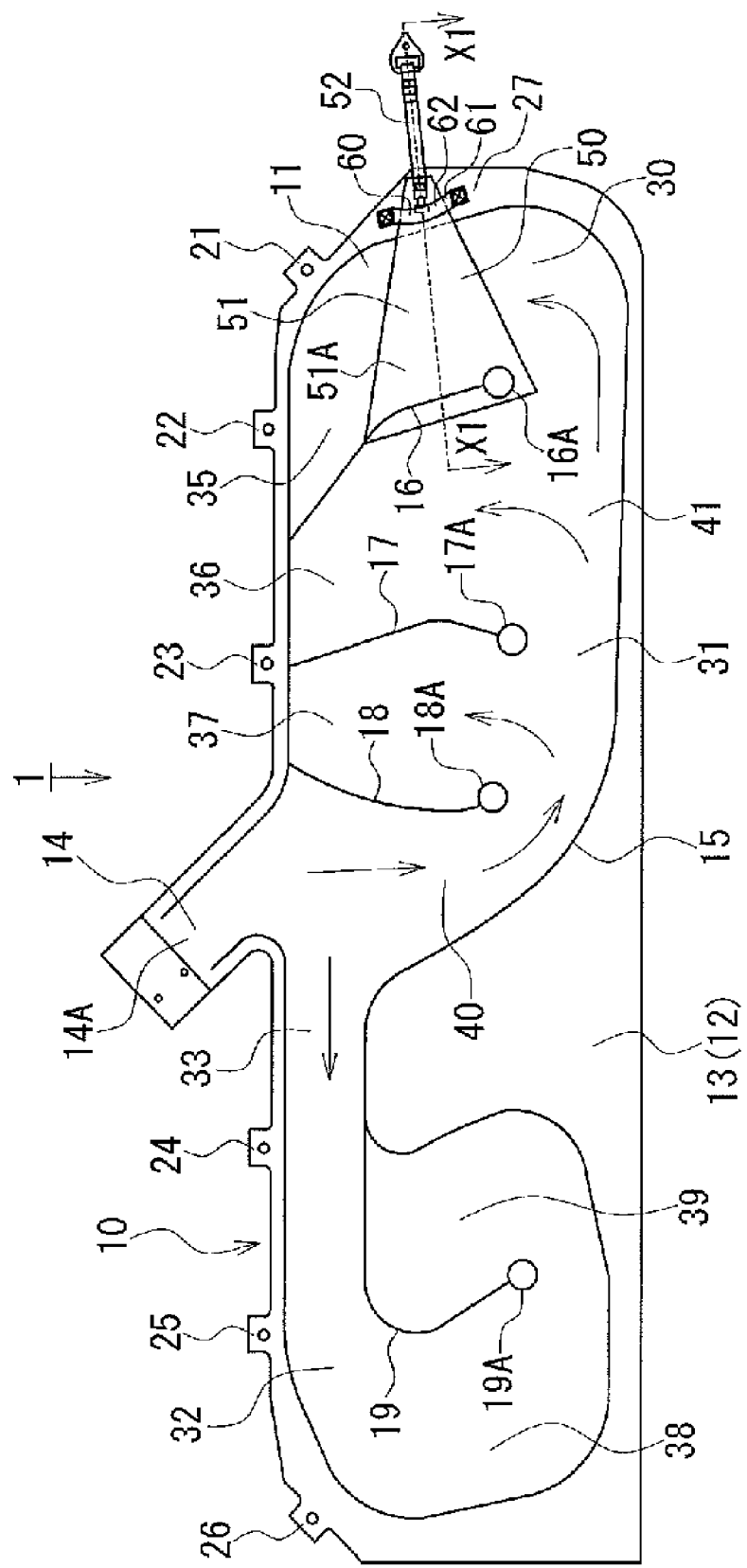
FIG. 2 is a diagram of an airbag spread on a flat surface.

FIG. 2 is a diagram of the airbag 10 spread on a flat surface. FIG. 2 shows the airbag 10, as viewed from the outside of the vehicle.

As shown in the figure, the airbag 10 is a long, bag-shaped member extending in the front-rear direction and is formed of, for example, resin-coated base fabric. Herein, the airbag 10 includes a front base fabric piece (front panel) 12, which will be located on the side of the occupant, and a back base fabric piece (back panel) 13, which will be located on the side of the side wall 91. Furthermore, the airbag 10 includes a gas supply portion 14, a plurality of (in FIG. 2, six) fixing fabric pieces 21 to 26, and a connecting member 50.

The plurality of fixing fabric pieces 21 to 26 are formed at the upper edge of the airbag 10 as integral parts thereof and are fixed to the front pillar 93 and the roof rail 92 with fixing means, such as bolts (not shown). The airbag 10 is attached to the vehicle body 99 via the fixing fabric pieces 21 to 26.

The front base fabric piece 12 and the back base fabric piece 13 are formed in the same shape, laid on top of each other, joined together along an outer-peripheral joining portion 15, face each other, and form an inflatable section 30 therebetween. The inflatable section 30 is configured to be inflated with gas generated by the inflator 2 (not shown in FIG. 2), is delimited by the outer-peripheral joining portion 15, and is formed between the opposing fabric pieces of the airbag 10 (i.e., the base fabric pieces 12 and 13). The outer-peripheral joining portion 15 determines the outer-peripheral shape of the inflatable section 30. The base fabric pieces 12 and 13 are joined together by sewing and bonding, at the outer-peripheral joining portion 15. That is, the base fabric pieces 12 and 13 are sewn together with one or more rows of stitching, along the outer-peripheral joining portion 15, and then a sewn portion is sealed with an adhesive. By doing so, the base fabric pieces 12 and 13 are joined in an air-tight manner along the outer-peripheral joining portion 15.

The outer-peripheral joining portion 15 forms a front inflatable section 31, a rear inflatable section 32, and a connecting inflatable section 33 in the airbag 10. The inflatable sections 31 to 33 collectively constitute the inflatable section 30 of the airbag 10. The front inflatable section 31 is located on the front side of the airbag 10. The front inflatable section 31 is inflated at a side of the center pillar 94 and the window 97 in the front door 95 and receives, mainly, an occupant seated in a front seat. The rear inflatable section 32 is located on the rear side of the airbag 10. The rear inflatable section 32 is inflated at the upper side of the rear door 96 and receives, mainly, an occupant in a rear seat. The connecting inflatable section 33 connects the front inflatable section 31 and the rear inflatable section 32. When the airbag 10 is inflated, portions other than the inflatable section 30 of the airbag 10 are kept uninflated.

The gas is supplied to the airbag 10 through the gas supply portion 14. The gas supply portion 14 is formed in the middle of the airbag 10 in the front-rear direction. Portions of the base fabric pieces 12 and 13 project obliquely upward from the upper edge of the airbag 10, at the gas supply portion 14. The edges of the base fabric pieces 12 and 13 are joined together so as to be continuous with the outer-peripheral joining portion 15, except for an insertion port 14A. Thus, the gas supply portion 14 is formed in a tubular shape having open ends and is provided at the upper edge of the airbag 10 as an integral part thereof. The inside of the gas supply portion 14 communicates with the outside of the airbag 10 at the insertion port 14A at one end and communicates with the inside of the inflatable section 30 at the other end.

The inflator 2 is inserted into the gas supply portion 14 from the insertion port 14A and is disposed inside the airbag 10. The gas supply portion 14 is fastened with a band (not shown) and is fixed to the inflator 2 in an air-tight manner. The inflator 2 generates gas inside the gas supply portion 14 and supplies the gas to the airbag 10. The gas is supplied to the front inflatable section 31, as well as to the rear inflatable section 32 via the connecting inflatable section 33. As a result, the airbag 10 is inflated and deployed.

The airbag 10 has a plurality of inner joining portions (first to fourth inner joining portions) 16 to 19 provided within the outer-peripheral joining portion 15 (inflatable section 30). The inner joining portions 16 to 19 are joining portions at which the opposing fabric pieces (i.e., base fabric pieces 12 and 13) of the airbag 10 are joined within the inflatable section 30 and are formed within the inflatable section 30, such that they extend from the outer-peripheral joining portion 15 toward the inner side of the inflatable section 30. The base fabric pieces 12 and 13 are joined together at the inner joining portions 16 to 19, in the same way as they are joined along the outer-peripheral joining portion 15, and each end of the inner joining portions 16 to 19 is joined in a circular shape within the inflatable section 30. Circular portions 16A to 19A of the inner joining portions 16 to 19 are formed away from the outer-peripheral joining portion 15.

The plurality of inner joining portions 16 to 19 are arranged at a distance from one another in the front-rear direction, forming a gas circulating portion and air chambers within the inflatable section 30. That is, the inner joining portions 16 to 19 are joining portions that divide the inflatable section 30. By dividing the inflatable section 30, first to fifth air chambers 35 to 39 are formed in the inflatable section 30. The first to third air chambers 35 to 37 are formed in the front inflatable section 31 by the first to third inner joining portions 16 to 18. The first air chamber 35 is located at the front end of the front inflatable section 31. These air chambers 35 to 37 are closed at the upper portions and side portions and are open only at the lower portions. The gas flows in these air chambers 35 to 37 only from the lower side.

An intermediate inflatable section 40 and a circulating portion 41 are formed in the front inflatable section 31. The intermediate inflatable section 40 is an air chamber that inflates between the gas supply portion 14 and the circulating portion 41. The intermediate inflatable section 40 is defined by the third inner joining portion 18 so as to extend downward from the gas supply portion 14, at the rear end of the front inflatable section 31. The circulating portion 41 is an air chamber that connects the lower portions of the second air chamber 36 and third air chamber 37. The circulating portion 41 is provided along the lower edge of the airbag 10 to communicate the lower portion of the intermediate inflatable section 40 and the lower portion of the first air chamber 35. The second air chamber 36 and the third air chamber 37 connect to the circulating portion 41, between the intermediate inflatable section 40 and the first air chamber 35. The gas flows from the intermediate inflatable section 40 to the first air chamber 35 through the circulating portion 41.

The gas generated by the inflator 2 is supplied to the intermediate inflatable section 40 from the gas supply portion 14, inflating the intermediate inflatable section 40 first. The gas flows from the intermediate inflatable section 40 to the circulating portion 41 within the front inflatable section 31. The circulating portion 41 is inflated, starting from the intermediate inflatable section 40 toward the first air chamber 35. The gas flows into the third air chamber 37 and the second air chamber 36 from below, while flowing through the circulating portion 41, and flows into the first air chamber 35 from below via the circulating portion 41. Following the circulating portion 41, the air chambers 35 to 37 start to inflate and sequentially inflate as the circulating portion 41 inflates. The air chambers 35 to 37 start to inflate, in sequence from the rear side to the front side. The first air chamber 35 starts to inflate last and reaches a fully inflated state after a predetermined time since the other air chambers, 36 and 37, have completed inflation.

The fourth air chamber 38 and the fifth air chamber 39 are delimited by the fourth inner joining portion 19 in the rear inflatable section 32. The gas generated by the inflator 2 passes through the connecting inflatable section 33 and the fourth air chamber 38 and flows into the fifth air chamber 39 from below, sequentially inflating the fourth and fifth air chambers 38 and 39 within the rear inflatable section 32.

Next, the connecting member 50 provided on the outside of the airbag 10 will be described.

Figure 3:
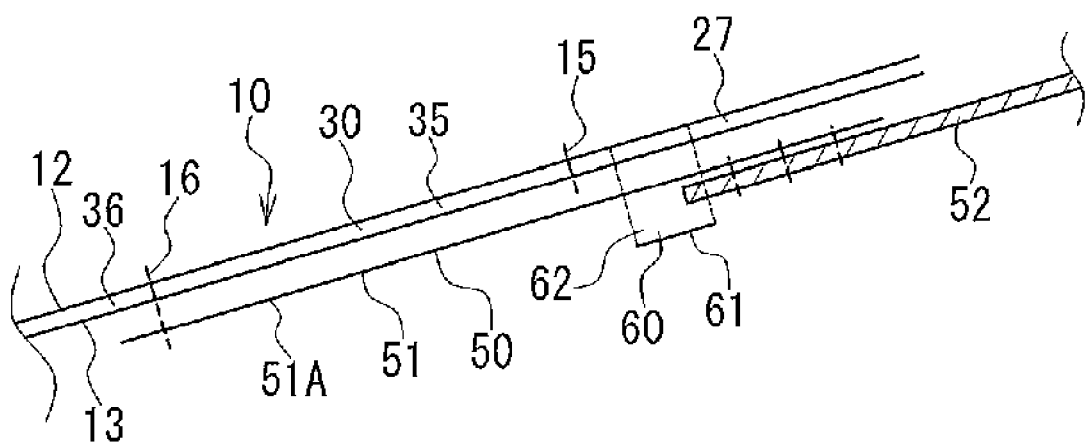
FIG. 3 is a sectional view of the airbag and a connecting member, taken along line X1-X1 in FIG. 2.

FIG. 3 is a sectional view of the airbag 10 and the connecting member 50, taken along line X1-X1 in FIG. 2. FIG. 3 does not show the end of the connecting member 50.

The connecting member 50 is attached to the vehicle body 99 and the airbag 10 to connect the airbag 10 to the vehicle body 99. As shown in FIGS. 2 and 3, one end (rear end) of the connecting member 50 is attached to a predetermined portion, in the inflatable section 30, of the airbag 10. The other end (front end) of the connecting member 50 is attached to the vehicle body 99 (front pillar 93). The connecting member 50 is fixed to the vehicle body 99 with fixing means, such as a bolt (not shown). The front portion 11 of the airbag 10 is connected to the front pillar 93 by the connecting member 50.

The connecting member 50 includes a support portion 51 that supports the inflatable section 30 of the airbag 10, and a vehicle-body attachment portion (hereinbelow, simply, "attachment portion") 52 to be attached to the vehicle body 99. The support portion 51 is disposed on the side wall 91 side of the inflatable section 30 (in FIG. 3, below the inflatable section 30) and overlaps the back base fabric piece 13. One end (rear end) of the support portion 51 is attached to the airbag 10. The attachment portion 52 is a belt-like member provided between the support portion 51 and the vehicle body 99. One end (rear end) of the attachment portion 52 is fixed to the other end (front end) of the support portion 51. The other end (front end) of the attachment portion 52 is attached to the vehicle body 99.

The support portion 51 of the connecting member 50 has a wide portion 51A, which has a larger width than the attachment portion 52. In this connecting member 50, the support portion 51 is formed of a triangular fabric piece (base fabric) and has, in entirety, a larger width than the attachment portion 52. The support portion 51 is gradually decreased in width from the rear end to the front end thereof. The support portion 51 is attached to an inner joining portion (herein, the first inner joining portion 16) of the airbag 10. The wide end of the support portion 51 is joined to the outer surface of the airbag 10 and is attached to the first inner joining portion 16. The end of the support portion 51 is joined to the airbag 10 at the first inner joining portion 16, at the same time when the base fabric pieces 12 and 13 are joined together at the first inner joining portion 16.

On the outside of the airbag 10, the support portion 51 is disposed along the outer surface of the inflatable section 30 on the side wall 91 side (i.e., the back base fabric piece 13). The inflatable section 30 on which the support portion 51 is disposed is a portion located between the vehicle body 99 connected by the connecting member 50 and the first inner joining portion 16 (herein, a portion corresponding to the first air chamber 35). The wide portion 51A of the support portion 51 is disposed on the side wall 91 side of the first air chamber 35.

The attachment portion 52 of the connecting member 50 is formed of a material that is less likely to expand than the support portion 51, so that tension is reliably applied to the airbag 10. At the time the connecting member 50 is pulled in the longitudinal direction, the expansibility (i.e., the proportion of the length after expanded to the length before expanded) of the attachment portion 52 is lower than the expansibility of the support portion 51. Accordingly, the attachment portion 52 constitutes a low expansion portion (or a low elongation portion) having a lower expansibility (or elongation) than the support portion 51. On the other hand, the support portion 51 is made of a material that can be easily folded together with the airbag 10.

A non-inflatable section 27 and an insertion portion (retaining portion) 60 are provided at the front end of the airbag 10. The non-inflatable section 27 is a portion of the airbag 10 that is located outside the inflatable section 30 and is not inflated. The airbag 10 has the non-inflatable section 27 at the end to be connected to the vehicle body 99 by the connecting member 50. The insertion portion 60 is provided on the non-inflatable section 27 of the airbag 10. The connecting member 50 is inserted into the insertion portion 60 so as to be movable and is held on the outer surface of the airbag 10 by the insertion portion 60. The insertion portion 60 joins the connecting member 50 with the airbag 10.

The insertion portion 60 provided on the airbag 10 includes a loop portion 62 that is formed of a strip-like restraint member 61. Ends of the restraint member 61 are fixed to the airbag 10. At this time, the ends of the restraint member 61 are joined to the outer surface of the non-inflatable section 27, such that the restraint member 61 is overlapped with the non-inflatable section 27. The connecting member 50 is inserted between the restraint member 61 and the airbag 10, thereby being restrained by the restraint member 61. In this way, the loop portion 62 is formed in a loop shape from the restraint member 61. The loop portion 62 is provided on the outer surface of the airbag 10, and the connecting member 50 passes therethrough. The connecting member 50 is held onto the airbag 10 by the loop portion 62.

The airbag device 1 activates the inflator 2 after being installed in the vehicle 90 and when receiving an activation signal. The inflator 2 generates gas and supplies the gas to the inflatable section 30, inflating and deploying the airbag 10. The airbag 10 is inflated and deployed like a curtain, while being unfolded, between the occupant and the side wall 91 and receives the occupants in the front seat and rear seat, protecting, mainly, the heads of the occupants.

Figure 4:
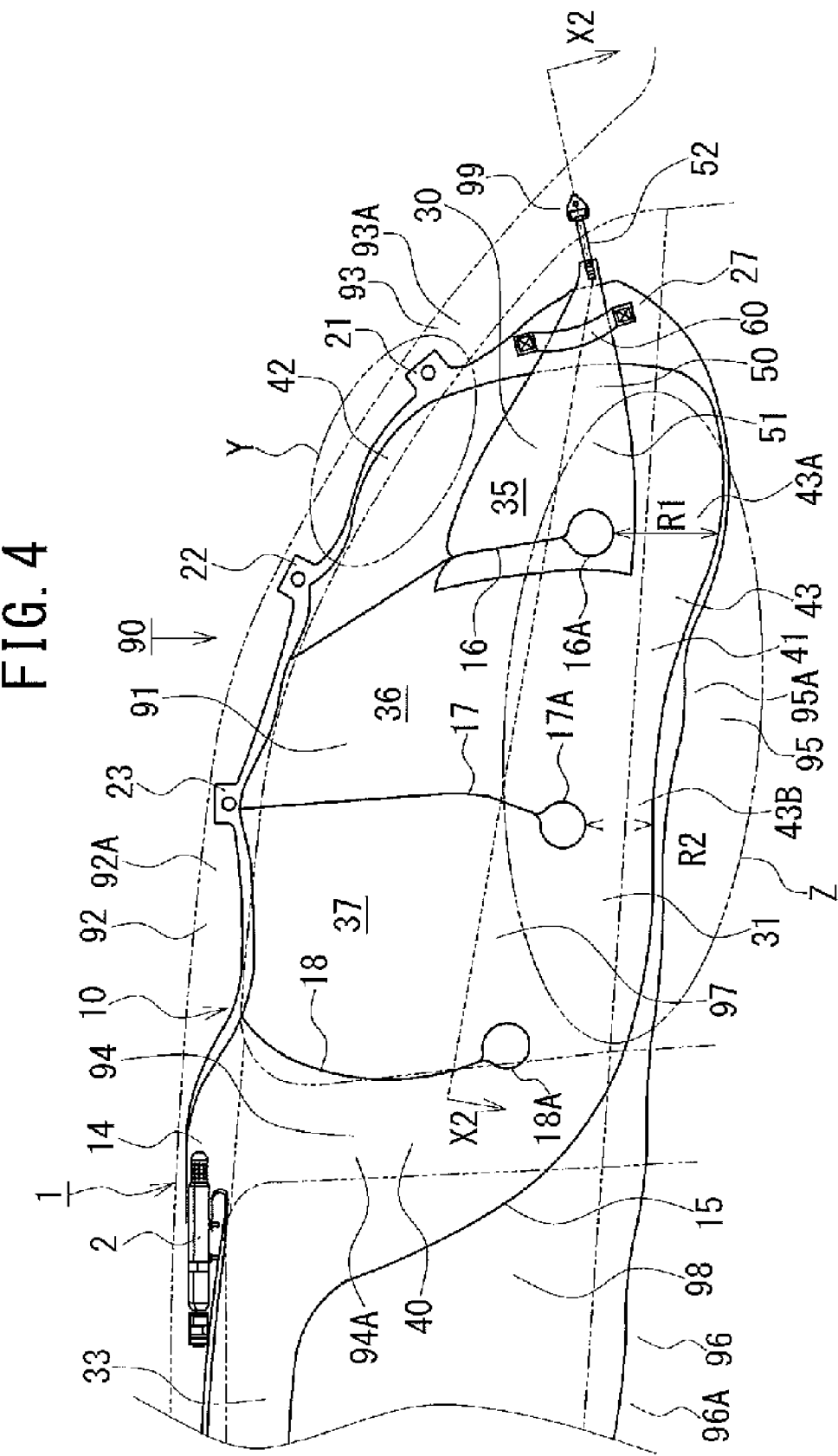
FIG. 4 is a diagram of the airbag that is inflated and deployed within a vehicle.

FIG. 4 is a diagram of the airbag 10 that is inflated and deployed within the vehicle 90. FIG. 4 is a diagram corresponding to FIG. 1, showing the side wall 91 of the vehicle 90 and the airbag device 1.

As shown in the figure, the airbag 10 pushes and opens the front pillar trim 93A and the headlining 92A and is deployed downward from the upper portion of the side wall 91. The airbag 10 is inflated and deployed along the side wall 91 so as to cover the side wall 91. The connecting member 50 is pulled between the vehicle body 99 and the airbag 10 that is being inflated and deployed. The airbag 10, by being pulled toward the side of the vehicle body 99 by a portion of the vehicle body 99 to which the connecting member 50 is attached, is deployed at a predetermined position inside the vehicle 90. The airbag 10 is deployed in a stable manner owing to the tension applied by the connecting member 50. At this time, the connecting member 50 is located at the window 97 and supports, within the window 97, the inflatable section 30 of the airbag 10 with the support portion 51.

Figure 5:
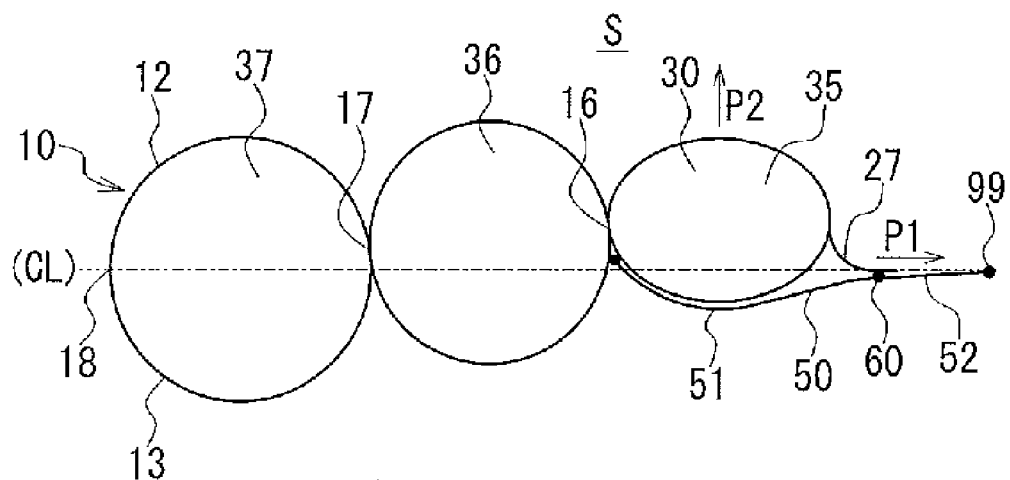
FIG. 5 is a sectional view of the airbag and the connecting member, taken along line X2-X2 in FIG. 4.

FIG. 5 is a sectional view of the airbag 10 and the connecting member 50, taken along line X2-X2 in FIG. 4, showing the airbag 10 and the connecting member 50 in a simplified manner.

Figure 6:
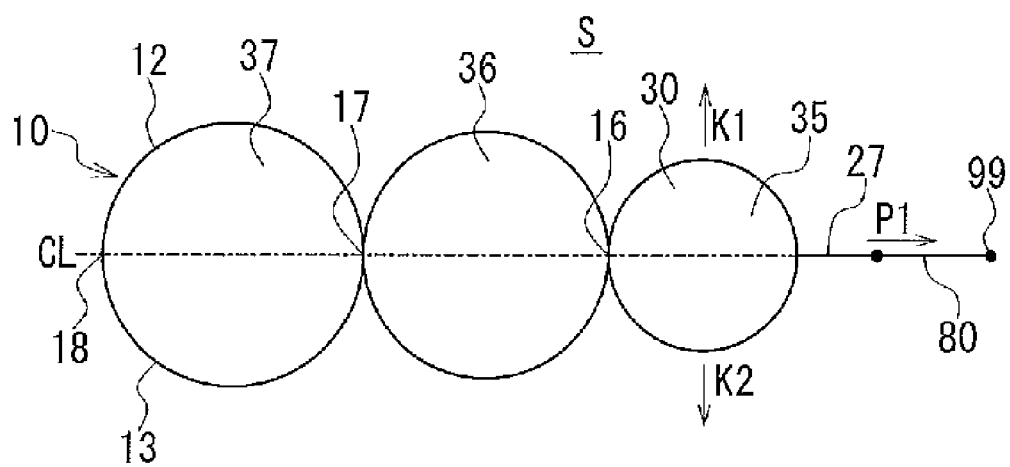
FIG. 6 is a sectional view of an airbag to which a connecting member according to a comparative example is attached.

FIG. 6 is a sectional view of the airbag 10 to which a connecting member 80 according to a comparative example is attached. The connecting member 80 does not have the support portion 51 and is attached to the front end of the airbag 10. In FIGS. 5 and 6, lines CL denote the center lines of the airbag 10 in FIG. 6.

The connecting member 80 (see FIG. 6) according to the comparative example pulls the end of the airbag 10 toward the side of the vehicle body 99 (in the direction indicated by an arrow P1). Due to the tension applied by the connecting member 80, the airbag 10 is disposed linearly along the center line CL. However, it is difficult to suppress the movement of the airbag 10 in directions intersecting the center line CL (indicated by arrows K1 and K2) with the connecting member 80 according to the comparative example. Thus, the airbag 10 might move toward the side of the side wall 91 or might be strongly pressed against the side wall 91.

In contrast, the connecting member 50 according to this embodiment (see FIG. 5) pulls the first inner joining portion 16 of the airbag 10 toward the side of the vehicle body 99 (arrow P1) with the support portion 51. The connecting member 50 is subjected to the tension between the vehicle body 99 and the first inner joining portion 16, and, as a result, the support portion 51 is pressed against the airbag 10. When the airbag 10 is inflated and deployed, the support portion 51 supports a portion of the inflatable section 30 (herein, the first air chamber 35) from the side wall 91 side and pushes the inflatable section 30 of the airbag 10 toward the inner side of the vehicle cabin S (arrow P2). The inflatable section 30 is inflated and deployed on the inner side of the vehicle cabin S with respect to the center line CL. Because the inflatable section 30 of the airbag 10 is subjected to a force acting in a direction away from the side wall 91, the airbag 10 is less likely to move toward the side wall 91. Thus, the airbag 10 is prevented from being excessively pressed against the side wall 91.

The airbag 10 (see FIG. 4) is inflated and deployed along the side wall 91 and is prevented from moving toward the side wall 91. Thus, the airbag 10 is inflated and deployed, while being prevented from excessively moving toward the side of the side wall 91. The inflatable section 30 is stably inflated and deployed in the vehicle cabin S owing to the support by the support portion 51. Therefore, even when the window 97 is open, the airbag 10 is inflated and deployed within the vehicle cabin S, without being pushed outside the vehicle through the window 97. The airbag 10 is prevented from touching the upper end of the front door 95 or being deployed outside the vehicle as a result of its touching the upper end of the front door 95. Furthermore, the deployment of the airbag 10 is not inhibited, and the airbag 10 is deployed, to the lower edge thereof, within the vehicle cabin S. The airbag 10 is deployed to the position of the door trims 95A and 96A, covering the windows 97 and 98.

The front inflatable section 31 of the airbag 10 is inflated and deployed in an area from the front pillar 93 to the center pillar 94 (i.e., the front area of the side wall 91). The intermediate inflatable section 40 is deployed along the center pillar 94 and overlaps the center pillar 94. The first to third air chambers 35 to 37 are inflated at the upper side of the front door 95, covering the window 97. The first air chamber 35 is located at the most front in the airbag 10 and is disposed between the front pillar 93 and the front door 95. The upper edge of the first air chamber 35 overlaps the front pillar 93. The circulating portion 41 extends in the front-rear direction, is disposed along the upper edge of the front door 95, and is inflated so as to overlap the front door 95. As a result, the circulating portion 41 fully or partially (herein, the lower portion thereof) overlaps the door trim 95A of the front door 95.

Like this, the inflatable section 30 of the airbag 10 has an upper inflatable section 42 and a lower inflatable section 43 that overlap the vehicle body 99. The upper inflatable section 42 and the lower inflatable section 43 constitute a part of the front inflatable section 31 and are provided at the upper edge and lower edge of the airbag 10. When the airbag 10 is inflated and deployed, the upper inflatable section 42 overlaps the front pillar 93 and is inflated between the front pillar 93 and the front pillar trim 93A (i.e., within the front pillar trim 93A). The upper inflatable section 42 is sandwiched between the front pillar 93 and the front pillar trim 93A. When the airbag 10 receives the occupant, the upper inflatable section 42 is supported by the front pillar 93.

Figure 7:
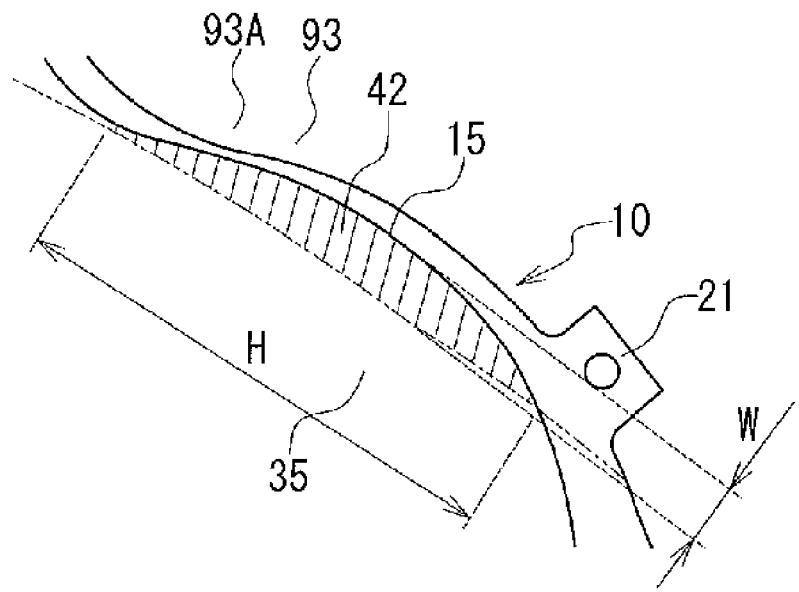
FIG. 7 is an enlarged view of an upper inflatable section of the airbag.

FIG. 7 is an enlarged view of the upper inflatable section 42 of the airbag 10 (shown with hatching in FIG. 7) in an area Y in FIG. 4. A reference numeral H shown in FIG. 7 indicates the length of the upper inflatable section 42 along the lower edge of the front pillar 93. A reference numeral W indicates the distance by which the upper inflatable section 42 overlaps the front pillar 93 (overlap amount).

As shown in the figure, the upper inflatable section 42 is a predetermined area of the first air chamber 35 and is provided at the upper edge of the first air chamber 35, including the outer-peripheral joining portion 15. Furthermore, the upper inflatable section 42 is formed in the airbag 10 such that the length H is larger than the overlap amount W. Herein, the length H is set to 100 mm. The overlap amount W is set to 40 mm.

When the airbag 10 is inflated and deployed, the lower inflatable section 43 (see FIG. 4) overlaps the door trim 95A provided on the door (herein, the front door 95) of the vehicle 90. The lower inflatable section 43 is inflated within the vehicle cabin S and comes into contact with the front surface of the door trim 95A. When the airbag 10 receives the occupant, the lower inflatable section 43 is supported by the door trim 95A. The lower inflatable section 43 of the airbag 10 is formed such that the front portion thereof is inflated downward to a larger size than the other portion. Thus, within the lower inflatable section 43, an under-pillar portion 43A is inflated downward to a larger size than the other portion (rear portion 43B). The under-pillar portion 43A of the lower inflatable section 43 is a portion that is inflated below the front pillar 93 and overlaps the door trim 95A located below the front pillar 93.

The under-pillar portion 43A is formed in the lower inflatable section 43 by making the front inflatable section 31 partially project downward and is provided below the first inner joining portion 16. The rear portion 43B of the lower inflatable section 43 is provided below the second inner joining portion 17. The first inner joining portion 16 is formed at a position farther from the outer-peripheral joining portion 15 on the lower side than the second inner joining portion 17. As a result, the under-pillar portion 43A is inflated to a larger thickness than the other portion (rear portion 43B) in the vehicle width direction. Herein, the diameter of the inflated under-pillar portion 43A, R1, is set to 105 mm. The diameter R1 is the diameter of the air chamber below the first inner joining portion 16, when inflated. The diameter of the inflated rear portion 43B, R2, is set to 95 mm. The diameter R2 is the diameter of the air chamber below the second inner joining portion 17, when inflated.

Figure 8:
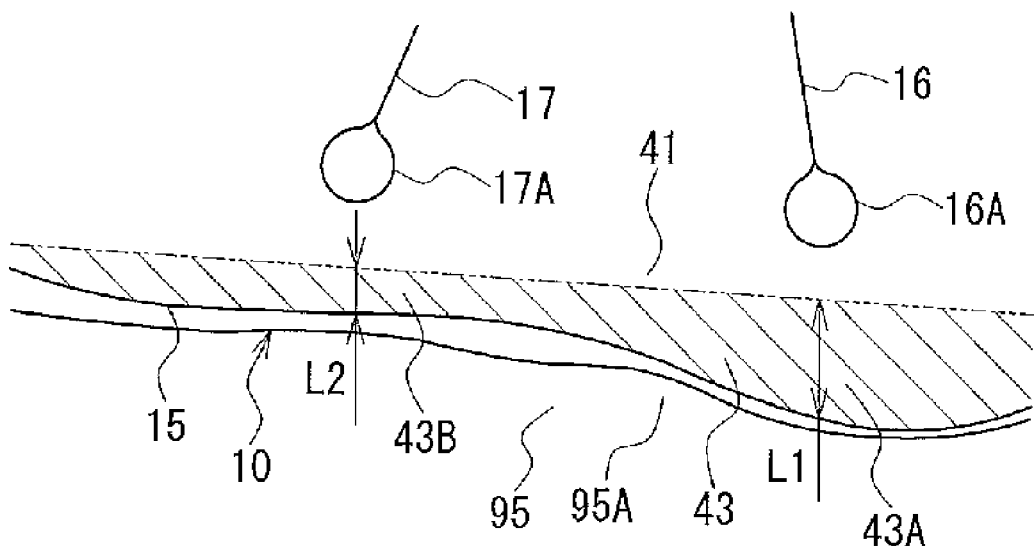
FIG. 8 is an enlarged view of a lower inflatable section of the airbag.

FIG. 8 is an enlarged view of the lower inflatable section 43 of the airbag 10 (shown with hatching in FIG. 8) in an area Z in FIG. 4. A reference numeral L1 shown on the lower inflatable section 43 in FIG. 8 indicates the distance by which the under-pillar portion 43A overlaps the door trim 95A (overlap amount). A reference numeral L2 shown on the lower inflatable section 43 indicates the distance by which the rear portion 43B overlaps the door trim 95A (overlap amount).

As shown in the figure, the lower inflatable section 43 is a predetermined area of the circulating portion 41 and is provided at the lower portion of the circulating portion 41, including the outer-peripheral joining portion 15. The under-pillar portion 43A overlaps the door trim 95A by a larger extent than the other portion (rear portion 43B) within the lower inflatable section 43. Herein, the overlap amount of the under-pillar portion 43A, L1, is set to 130 mm. The overlap amount of the rear portion 43B, L2, is set to 50 mm. The under-pillar portion 43A is inflated downward to a relatively large size within the lower inflatable section 43 and overlaps the door trim 95A by a relatively large distance.

When the airbag 10 (see FIG. 4) receives the occupant, the upper inflatable section 42 and the lower inflatable section 43 are pressed against the vehicle body 99 (the front pillar 93 and the door trim 95A) of the vehicle 90. The front pillar 93 and the door trim 95A interfere with the upper inflatable section 42 and the lower inflatable section 43, holding the upper inflatable section 42 and the lower inflatable section 43. As a result, the upper inflatable section 42 and the lower inflatable section 43 are supported by the vehicle body 99 and, thus, are prevented from moving in the vehicle-exterior direction. The upper edge and lower edge of the airbag 10 are supported by the upper inflatable section 42 and the lower inflatable section 43 at the front side of the airbag 10, whereby the airbag 10 is held by the vehicle body 99. Thus, deformation and movement of the airbag 10 in the vehicle-exterior direction are suppressed.

The airbag 10 is pushed by the occupant and is deformed in the vehicle-exterior direction. At this time, because the airbag 10 is supported by the vehicle body 99 at two (upper and lower) positions, the degree of deformation is reduced. The lower inflatable section 43 of the airbag 10 is supported by the door trim 95A and, hence, is prevented from moving to the outside of the window 97. As a result, when receiving the occupant, the airbag 10 is kept inflated so as to cover the side wall 91. Thus, the occupant is reliably received by the airbag 10, without being ejected from the vehicle. Even when the lower inflatable section 43 is disengaged from the door trim 95A, movement of the occupant is sufficiently stopped while the lower inflatable section 43 is supported by the door trim 95A. Accordingly, the occupant is prevented from being ejected from the vehicle.

As has been described above, with the connecting member 50 having the support portion 51, the airbag device 1 according to this embodiment can reliably inflate and deploy the airbag 10 within the vehicle cabin S. Even when the window 97 is open, the airbag 10 is stably inflated and deployed within the vehicle cabin S. Thus, it is possible to reliably receive the occupant. It is also possible to improve the performance of the airbag 10 in preventing the occupant from being ejected from the vehicle (ejection prevention performance).

By attaching the support portion 51 of the connecting member 50 to the first inner joining portion 16, the strength of a portion of the airbag 10 to be connected to the vehicle body 99 is increased. Furthermore, the tension applied to the connecting member 50 is increased, making it possible to reliably push the inflatable section 30 with the support portion 51. The inflatable section 30 is stably supported by the support portion 51 from the side wall 91 side. Because the first inner joining portion 16 is a joining portion that delimits the air chambers 35 and 36, there is no need to separately provide, on the airbag 10, a joining portion for attaching the support portion 51. Therefore, it is possible to easily attach the support portion 51 to the airbag 10.

A large area of the inflatable section 30 can be stably supported by the wide portion 51A of the support portion 51. Because the large area of the inflatable section 30 is pressed, the movement of the inflatable section 30 toward the side of the side wall 91 is reliably suppressed. Because the attachment portion 52 of the connecting member 50 is the low expansion portion, expansion of the attachment portion 52 is suppressed. Thus, it is possible to reliably apply tension to the airbag 10.

Because the insertion portion 60 of the airbag 10 holds the connecting member 50 so as to be movable, the support portion 51 is precisely disposed at a portion of the inflatable section 30 that is supposed to be supported. Thus, the behavior and the position of the inflatable section 30 during deployment can be stabilized. When the insertion portion 60 is provided on the non-inflatable section 27 of the airbag 10, an end of the airbag 10 is tied to the connecting member 50. As a result, the movement of the vicinity of the end of the airbag 10 is suppressed. By forming the insertion portion 60 from the loop portion 62, the insertion portion 60 can be easily formed on the outer surface of the airbag 10, and it is possible to easily cope with a change in width of the support portion 51.

Owing to the connecting member 50, the lower inflatable section 43 of the airbag 10 can be made to reliably overlap the vehicle body 99. By making the upper inflatable section 42 and the lower inflatable section 43 overlap the vehicle body 99, the ejection prevention performance is further improved. Furthermore, compared with a configuration in which only the lower inflatable section 43 is made to overlap the vehicle body 99, the ejection prevention performance of the airbag 10 can be improved with a small amount of overlap in total. This enables a reduction in size of the airbag 10, leading to reductions in amount of base fabric needed and cost of the airbag 10. Accordingly, the airbag device 1 can be manufactured at low cost.

In this embodiment, within the lower inflatable section 43, the under-pillar portion 43A overlaps the door trim 95A by a larger area than the rear portion 43B does. Hence, on the front side of the airbag 10, the upper and lower portions of the airbag 10 can be securely supported. By making only the under-pillar portion 43A is overlapped by a large area, the volume of the airbag 10 can be reduced.

Because the under-pillar portion 43A of the lower inflatable section 43 is inflated to a larger thickness than the rear portion 43B in the vehicle width direction, the rigidity of the under-pillar portion 43A is increased. Thus, when the airbag 10 receives the occupant, the under-pillar portion 43A is less likely to be deformed. Because deformation of the under-pillar portion 43A is suppressed, the under-pillar portion 43A is reliably and stably supported by the door trim 95A. By making only the under-pillar portion 43A inflate to a large thickness, the volume of the airbag 10 can be reduced, compared with a configuration in which the entirety of the lower inflatable section 43 is inflated to a large thickness.

Note that the insertion portion 60 may be provided at a position other than the non-inflatable section 27 of the airbag 10, and a plurality of insertion portions 60 may be provided on the airbag 10. The support portion 51 of the connecting member 50 may be attached to an inner joining portion other than the first inner joining portion 16 (e.g., the inner joining portion 17 or 18). For example, when the support portion 51 is attached to the third inner joining portion 18, the insertion portion 60 may be provided on the non-inflatable section 27 and two inner joining portions, 16 and 17. The connecting member 50 is held on the airbag 10 by three insertion portions 60. It is also possible that an inner joining portion is formed in any one of the air chambers 35 to 37 of the inflatable section 30, and the support portion 51 is attached to this inner joining portion. The connecting member 50 may be provided on various airbags 10 that are disposed at the upper portion of the side wall 91. The way of folding the airbag 10 is not limited to the above-described examples, and the airbag 10 may be folded in other ways, as long as it can be inflated and deployed along the side wall 91, between the occupant and the side wall 91.

The connecting member 50 (see FIG. 2) may be provided on the rear portion of the airbag 10 and the rear inflatable section 32. In this case, one end (front end) of the connecting member 50 is attached to the fourth inner joining portion 19 of the rear inflatable section 32. The other end (rear end) of the connecting member 50 is attached to the vehicle body 99 (rear pillar). The rear inflatable section 32 may be provided with an inflatable section similar to the upper inflatable section 42 and the lower inflatable section 43. That is, when the airbag 10 is inflated and deployed, a portion of the rear inflatable section 32 (upper inflatable section) may be made to overlap the rear pillar of the vehicle 90. Furthermore, when the airbag 10 is inflated and deployed, a portion of the rear inflatable section 32 (lower inflatable section) may be made to overlap the door trim 96A provided on the door of the vehicle 90 (herein, the rear door 96). By doing so, similarly to the above, the airbag 10 is reliably inflated and deployed within the vehicle cabin S. It is also possible to improve the ejection prevention performance of the airbag 10 for occupants in the rear seats.

The airbag 10 may be formed by joining the base fabric pieces 12 and 13 only by sewing along the outer-peripheral joining portion 15. The airbag 10 may be made of jacquard fabric. When the airbag 10 is made of jacquard fabric, the inflatable section 30 is formed between jacquard fabric pieces of the airbag 10. The inflatable section 30 is formed between the opposing fabric pieces of the airbag 10. The connecting member 50 is attached to an inner joining portion (for example, the first inner joining portion 16), at which the opposing fabric pieces are joined within the inflatable section 30.

Next, the connecting member according to another embodiment will be described.

Figure 9:
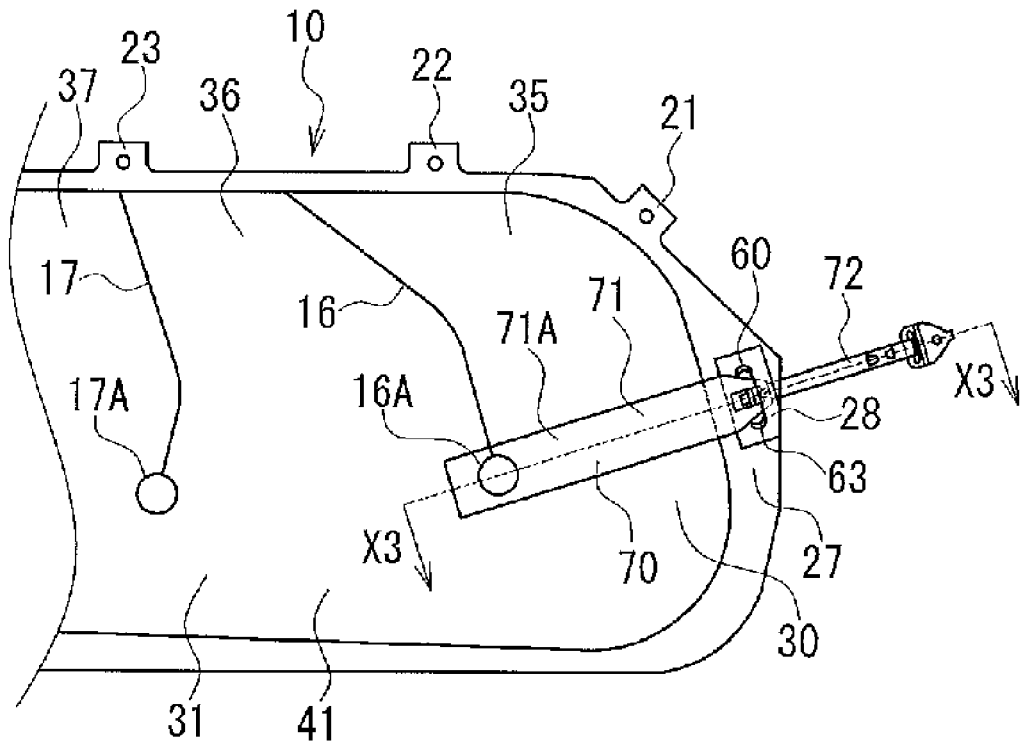
FIG. 9 is a diagram of a connecting member according to another embodiment.
Figure 10:
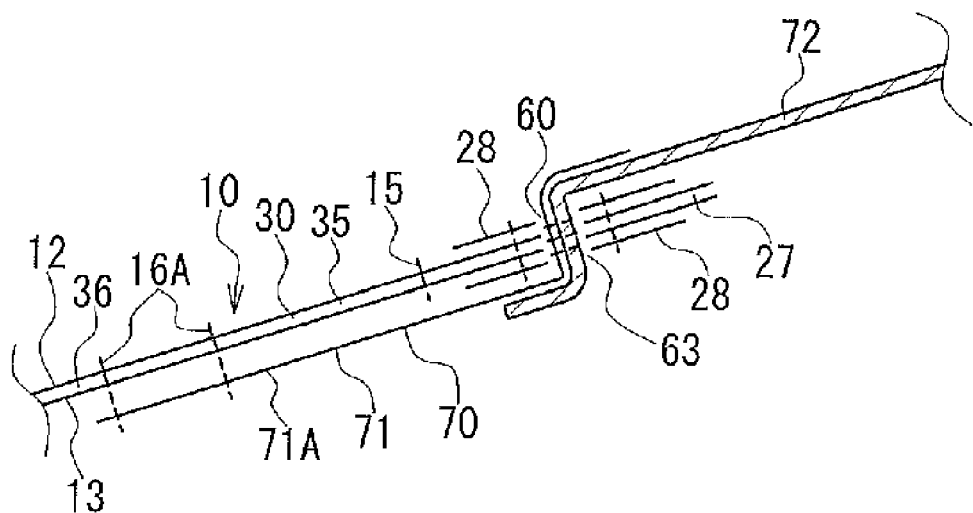
FIG. 10 is a sectional view of an airbag and the connecting member, taken along line X3-X3 in FIG. 9.

FIG. 9 is a diagram of a connecting member 70 according to another embodiment. FIG. 9 also shows a portion of the airbag 10. Similarly to FIG. 2, FIG. 9 is a diagram of the airbag 10 unfolded on a plane. FIG. 10 is a sectional view of the airbag 10 and the connecting member 70, taken along line X3-X3 in FIG. 9. In FIG. 10, illustration of the end of the connecting member 70 is omitted.

As shown in the figure, similarly to the above-described connecting member 50, the connecting member 70 includes a support portion 71 that supports the inflatable section 30 and an attachment portion 72 that is to be attached to the vehicle body 99. The support portion 71 has a wide portion 71A that has a larger width than the attachment portion 72. The support portion 71 is formed of a strip-like base fabric piece and is attached to the first inner joining portion 16 (circular portion 16A).

The airbag 10 has reinforcing fabric pieces 28 and an insertion portion 60 in the non-inflatable section 27. The reinforcing fabric pieces 28 are formed of rectangular base fabric pieces and are joined to both sides of the airbag 10. The insertion portion 60 includes an opening 63 provided in the non-inflatable section 27 of the airbag 10. The reinforcing fabric pieces 28 are joined to the insertion portion 60 to reinforce the insertion portion 60. The opening 63 includes a slit (or a through-hole) provided through the reinforcing fabric pieces 28 and the base fabric pieces 12 and 13. The connecting member 70 is inserted into the opening 63 so as to be movable and is retained by the airbag 10. When the opening 63 is used as the insertion portion 60, the insertion portion 60 can be easily formed in the airbag 10.

REFERENCE SIGNS LIST

1: airbag device;
2: inflator;
2A: discharge port;
10: airbag;
11: front portion;
12: front base fabric piece;
13: back base fabric piece;
14: gas supply portion;
14A: insertion port;
15: outer-peripheral joining portion;
16 to 19: inner joining portion;
21 to 26: fixing fabric piece;
27: non-inflatable section;
28: reinforcing fabric piece;
30: inflatable section;
31: front inflatable section;
32: rear inflatable section;
33: connecting inflatable section;
35 to 39: air chamber;
40: intermediate inflatable section;
41: circulating portion;
42: upper inflatable section;
43: lower inflatable section;
43A: under-pillar portion;
43B: rear portion;
50: connecting member;
51: support portion;
51A: wide portion;
52: attachment portion;
60: insertion portion;
61: restraint member;
62: loop portion;
63: opening;
70: connecting member;
71: support portion;
71A: wide portion;
72: attachment portion;
90: vehicle;
91: side wall;
92: roof rail;
92A: headlining;
93: front pillar;
93A: front pillar trim;
94: center pillar;
95: front door;
95A: door trim;
96: rear door;
97: window;
98: window;
99: vehicle body; and
S: vehicle cabin.

The invention claimed is:

1. An airbag device installed in a side wall inside a vehicle cabin, the airbag device comprising:
an airbag that is disposed in an upper portion of the side wall and has an inflatable section configured to be inflated with gas;
an inflator that supplies gas to the inflatable section to inflate and deploy the airbag downward; and
a connecting member that connects the airbag and a vehicle body and is pulled between the vehicle body and the airbag that is being inflated and deployed,
wherein the airbag includes fabric pieces facing each other, forming the inflatable section therebetween, and an inner joining portion, which is a joining portion dividing the inflatable section and forming air chambers, at which the opposing fabric pieces are joined within the inflatable section and to which a support portion of the connecting member is attached, and has a non-inflatable section at an end on the vehicle body side, and an insertion portion being provided in the non-inflatable section of the airbag to retain the connecting member inserted therein so as to be movable, and
wherein the connecting member includes the support portion that is disposed along a side wall side of the inflatable section located between the vehicle body connected by the connecting member and the inner joining portion, and supports the inflatable section from the side wall side of the airbag and pushes the inflatable section toward the inner side of the vehicle cabin when the airbag is inflated and deployed.

2. The airbag device according to claim 1,
wherein the inflatable section includes a lower inflatable section that overlaps a door trim provided on a door of the vehicle when the airbag is inflated and deployed.

3. The airbag device according to claim 2,
wherein the inflatable section includes an upper inflatable section that overlaps a front pillar of the vehicle when the airbag is inflated and deployed, and
wherein the door trim overlapped by the lower inflatable section is provided on a front door of the vehicle.

4. The airbag device according to claim 1,
wherein the connecting member includes a vehicle-body attachment portion that is provided between the support portion and the vehicle body and is attached to the vehicle body.

5. The airbag device according to claim 4,
wherein the vehicle-body attachment portion of the connecting member is a low expansion portion that has lower expansibility than the support portion.

6. The airbag device according to claim 4,
wherein the support portion of the connecting member has a wide portion that has a larger width than the vehicle-body attachment portion.

7. The airbag device according to claim 1,
wherein the insertion portion includes a loop portion provided on an outer surface of the airbag, through which the connecting member passes.

8. The airbag device according to claim 1,
wherein the insertion portion is an opening provided in the non-inflatable section of the airbag.

* * * * *